(12) United States Patent
Hacker

(10) Patent No.: US 8,877,053 B2
(45) Date of Patent: Nov. 4, 2014

(54) LIQUID FILTER ARRANGEMENT AND METHODS

(71) Applicant: Donaldson Company, Inc., Minneapolis, MN (US)

(72) Inventor: John R. Hacker, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/732,918

(22) Filed: Jan. 2, 2013

(65) Prior Publication Data

US 2013/0118974 A1    May 16, 2013

Related U.S. Application Data

(63) Continuation of application No. 13/397,377, filed on Feb. 15, 2012, now Pat. No. 8,440,078, which is a continuation of application No. 12/137,934, filed on Jun. 12, 2008, now Pat. No. 8,123,937.

(60) Provisional application No. 60/943,962, filed on Jun. 14, 2007.

(51) Int. Cl.
| | |
|---|---|
| *B01D 29/13* | (2006.01) |
| *B01D 29/21* | (2006.01) |
| *B01D 35/147* | (2006.01) |
| *B01D 29/96* | (2006.01) |

(52) U.S. Cl.
CPC .............. *B01D 29/13* (2013.01); *B01D 35/147* (2013.01); *B01D 29/21* (2013.01); *B01D 2201/291* (2013.01); *B01D 2201/0415* (2013.01); *B01D 2201/305* (2013.01)
USPC .......................... 210/232; 210/416.5; 210/429

(58) Field of Classification Search
USPC .............. 210/232, 416.5, 418, 429, 435, 437, 210/439
See application file for complete search history.

(56) References Cited

U.S. PATENT DOCUMENTS

| | | | |
|---|---|---|---|
| 2,533,266 A | 12/1950 | Kovacs et al. | |
| 2,693,281 A | 11/1954 | Winzen | |

(Continued)

FOREIGN PATENT DOCUMENTS

| | | | |
|---|---|---|---|
| DE | 3904701 A1 | 8/1990 | |
| DE | 4214500 A1 | 11/1993 | |

(Continued)

OTHER PUBLICATIONS

International Search Report, mailed Nov. 20, 2008 (PCT/US2008/066739.

*Primary Examiner* — Fred Prince
(74) *Attorney, Agent, or Firm* — Merchant & Gould P.C.

(57) ABSTRACT

A filter element includes filter media, first and second end caps, a latch arrangement projecting from the first end cap, a tubular neck extending from the first end cap and a valve head oriented within the first end cap aperture constructed and arranged to move between a position sealing the first end cap aperture and exposing the first end cap aperture. A filter assembly includes a filter element, as characterized herein, and including a filter base and a service cover. A method of servicing includes removing an old filter element, operably mounting a new filter element in a filter base including engaging a valve head against a spring member in the filter base, and operably mounting the service cover over the new filter element and filter base. A method of filtering includes directing liquid into a filter assembly, blocking a first end cap aperture by using a spring member in the filter base to urge the valve head against a rim of a tubular neck extending from the filter element, and directing liquid through the filter media to filter the liquid.

7 Claims, 5 Drawing Sheets

(56) References Cited

U.S. PATENT DOCUMENTS

| | | |
|---|---|---|
| 3,295,680 A | 1/1967 | Wilber |
| 3,333,703 A | 8/1967 | Scavuzzo et al. |
| 3,807,561 A | 4/1974 | Cullis |
| 4,906,365 A | 3/1990 | Baumann et al. |
| 5,066,391 A | 11/1991 | Faria |
| 5,374,355 A | 12/1994 | Habiger et al. |
| 5,538,626 A | 7/1996 | Baumann |
| 5,770,054 A | 6/1998 | Ardes |
| 5,770,065 A * | 6/1998 | Popoff et al. ............... 210/232 |
| 6,579,448 B2 | 6/2003 | Dworatzek |
| RE38,917 E | 12/2005 | Ardes |
| 8,123,937 B2 | 2/2012 | Hacker |
| 2002/0139735 A1 | 10/2002 | Stenersen et al. |
| 2003/0132158 A1 * | 7/2003 | Clausen et al. ............... 210/450 |
| 2005/0072721 A1 | 4/2005 | Knight |
| 2005/0224407 A1 | 10/2005 | Hacker |
| 2008/0035540 A1 | 2/2008 | Pflueger et al. |
| 2008/0142426 A1 | 6/2008 | Greco et al. |

FOREIGN PATENT DOCUMENTS

| | | |
|---|---|---|
| DE | 4310234 C1 | 8/1994 |
| EP | 0254776 B1 | 3/1991 |
| GB | 526736 | 9/1940 |
| WO | WO 2006/091557 A2 | 8/2006 |
| WO | WO 2008/134494 A2 | 11/2008 |

* cited by examiner

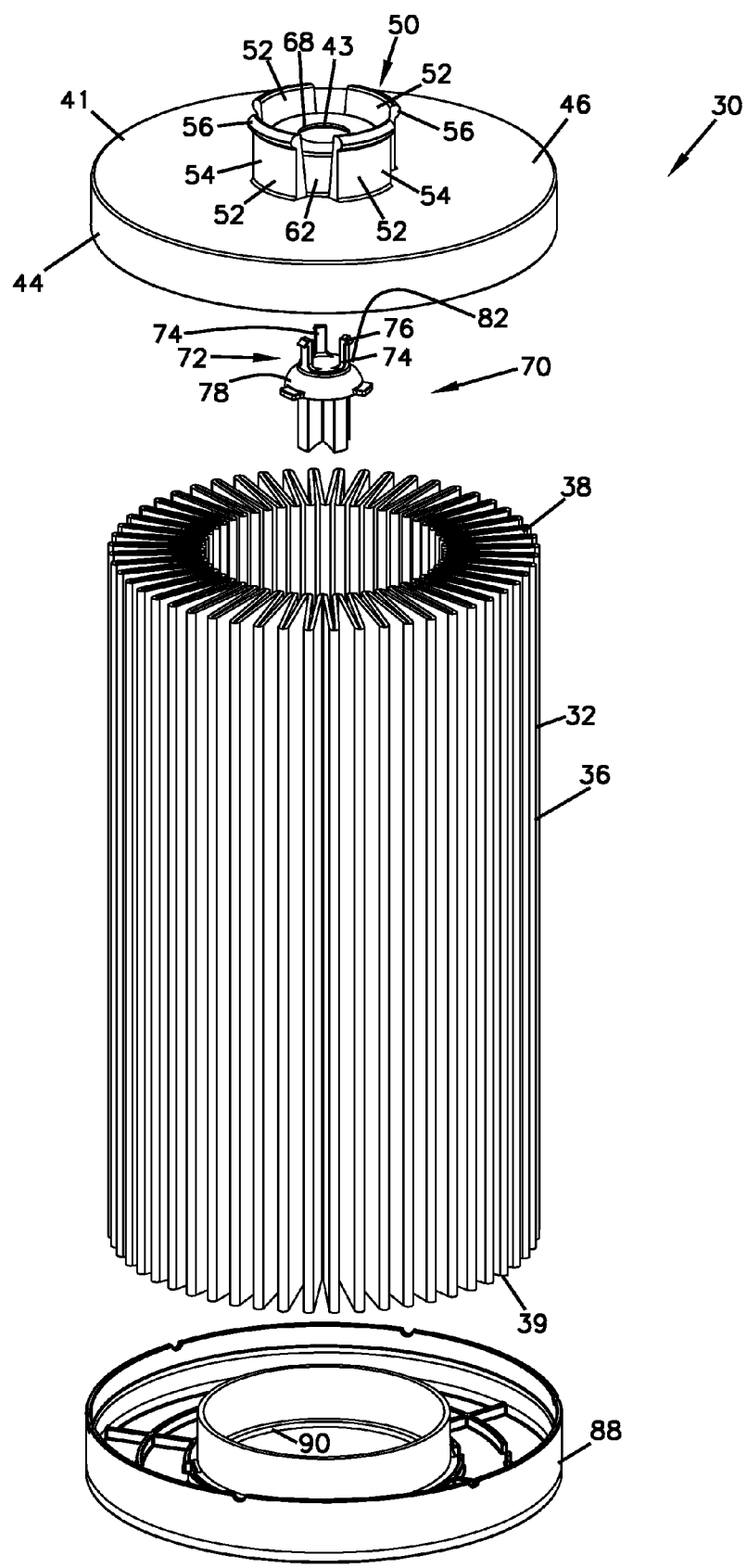

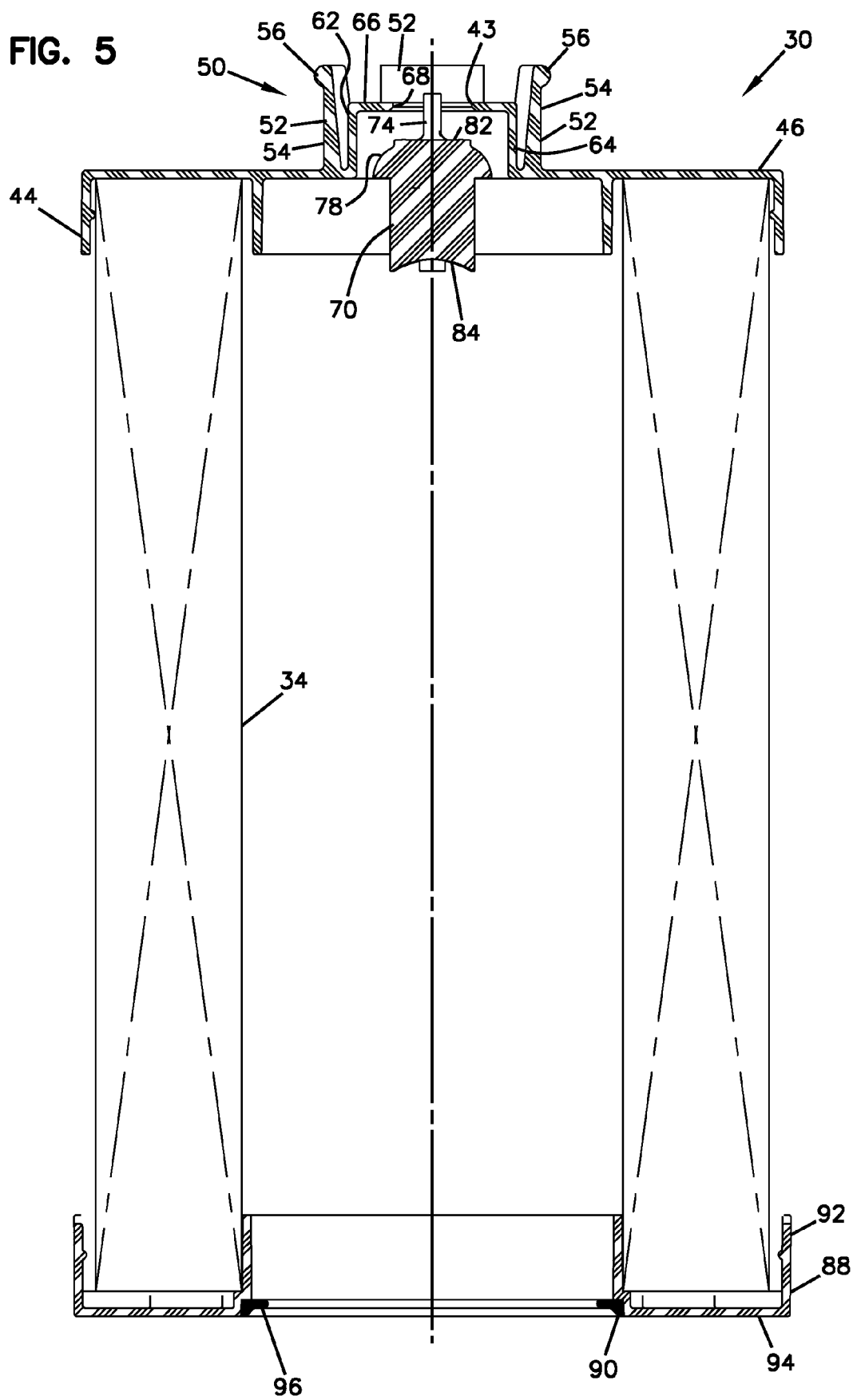

LIQUID FILTER ARRANGEMENT AND METHODS

CROSS REFERENCE TO RELATED APPLICATIONS

This application is a continuation of application Ser. No. 13/397,377, filed Feb. 15, 2012, which is a continuation of application Ser. No. 12/137,934 filed Jun. 12, 2008, now U.S. Pat. No. 8,123,937, which application claims the benefit of provisional application Ser. No. 60/943,962, filed Jun. 14, 2007, which applications are incorporated herein by reference in their entirety.

TECHNICAL FIELD

This application describes filter arrangements. In particular, this application describes a filter cartridge usable in a filter bowl for purifying liquids, such as oil for engines.

BACKGROUND

Filters are commonly used in connection with lubrication systems and fuel systems for internal combustion engines, and hydraulic systems for heavy-duty equipment. Filters are often used in many other types of liquid systems. In these types of systems, the filter is changed periodically. In the art, there are at least two standard types of filters used. One type is a spin-on canister filter, while the other is a bowl-cartridge filter. This application addresses bowl-cartridge filters.

Bowl-cartridge filters typically include a reusable bowl (or service cover) holding a replaceable filter element (cartridge filter). Bowl-cartridge filters are mounted onto a filter head or filter base, wherein liquid to be cleaned passes through the filter head (base), into the bowl (service cover), through the replaceable cartridge filter, outside of the bowl (service cover), and back into the filter head (base). After a period of use, the bowl-cartridge filter is removed from the filter head (base), and the replaceable cartridge filter is removed from the reusable bowl (service cover). The old cartridge filter is discarded with a new cartridge filter. The new cartridge filter is operably mounted into the reusable bowl (service cover) to provide a refurbished bowl-cartridge filter. This refurbished bowl-cartridge filter containing the new cartridge filter is then mounted onto the filter head (base).

SUMMARY OF THE DISCLOSURE

A filter element is provided including a tubular extension of pleated filter media, a first end cap, a second end cap, and a latch arrangement projecting from the first end cap. The filter element also includes a tubular neck extending from the first end cap circumscribing an aperture in the first end cap. The tubular neck is circumscribed by the latch arrangement. The filter element also includes a valve head oriented within the first end cap aperture and constructed and arranged to move between a position sealing the first end cap aperture and exposing the first end cap aperture.

In another aspect, a filter assembly is provided including a filter element, as characterized above, and including a filter base and a service cover. The filter element operably mounts within the filter base, and the service cover operably and removably mounts over the filter base and the filter element.

In another aspect, a method of servicing a filter arrangement includes removing a service cover and a used filter element from a filter base; providing a new filter element having a first end cap with a tubular neck extending therefrom and circumscribing a first end cap aperture and also including a valve head oriented within the first end cap aperture; operably mounting the new filter element in the filter base including engaging the valve head against a spring member in the filter base; and operably mounting the service cover over the new filter element and filter base.

In another aspect, a method of filtering is provided. The method includes directing liquid to be filtered into a filter assembly that includes a filter assembly operably installed in a filter base and a service cover, the filter element including a tubular extension of filter media, a first end cap having a tubular neck extending therefrom and circumscribing a first end cap aperture, and a valve head oriented within the first end cap aperture; blocking the first end cap aperture by using a spring member in the filter base to urge the valve head against a rim of the tubular neck; and directing liquid filter through the media to filter the liquid.

BRIEF DESCRIPTION OF THE DRAWINGS

FIG. 4 is an exploded perspective view of the filter element depicted in FIGS. 1-3; and FIG. 5 is a cross-sectional view of the filter element depicted in FIGS. 1-4.

DETAILED DESCRIPTION

This disclosure describes embodiments of a filter element that are usable within a reusable service cover for mounting onto a filter base. The filter elements are usable in assemblies that can be used in a "top-load" orientation. By the term "top-load", it is meant that the filter assembly (filter base plus service cover within the filter element operably installed therein) is installed in an orientation that permits servicing or access to the filter assembly from a position over or above whatever part that remains fixed to the equipment (for example, the engine, generator, or whatever is the applicable machine part) in operational position during servicing, when the equipment is in normal, operable orientation. In many convenient top-load configurations, the person servicing the filter assembly is not required to be in a position underneath or below the equipment. Instead, the person servicing the filter assembly is able to access it from the top of the equipment. For example, in a vehicle having an engine that is selectively accessible by a movable hood, the filter assembly would be accessible merely by raising the hood of the vehicle and then removing the service cover.

One example of a filter assembly in a top-load configuration having a service cover and a filter head is described in U.S. Pat. No. 5,770,054, incorporated herein by reference.

Figure 1:
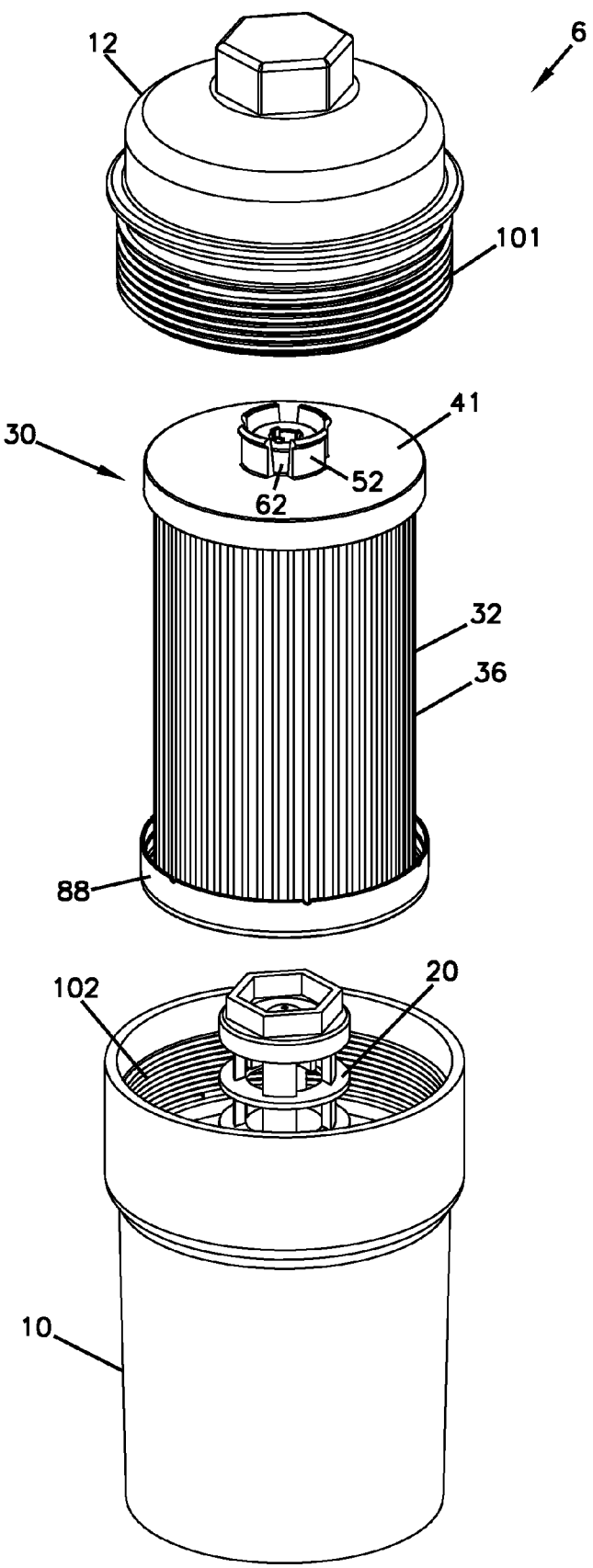
FIG. 1 is an exploded perspective view of an embodiment of a filter assembly, including a service cover, a filter element, and a filter base, constructed according to principles of this disclosure.
Figure 2:
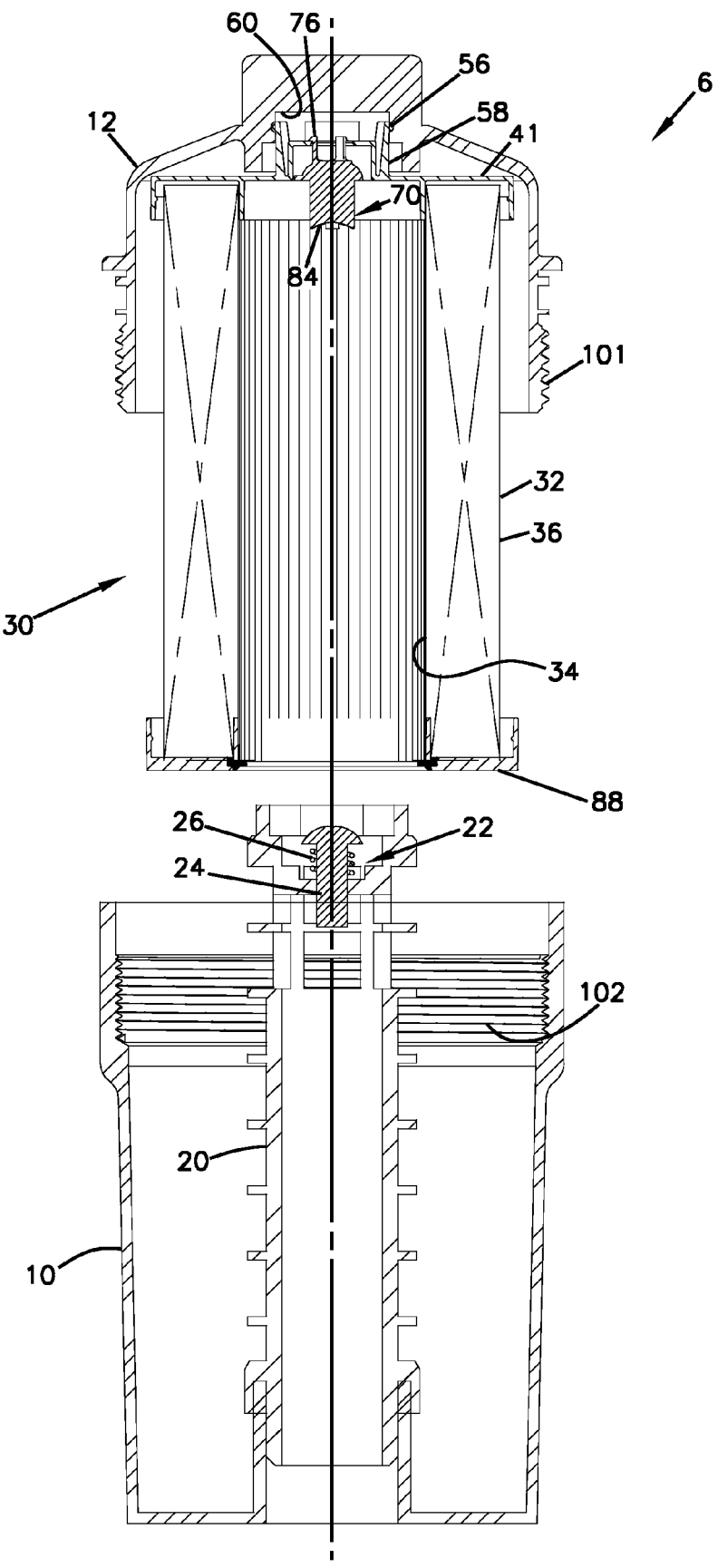
FIG. 2 is a cross-sectional view of the filter assembly depicted in FIG. 1, and showing the service cover mounted on the filter element but not mounted on the filter base.
Figure 3:
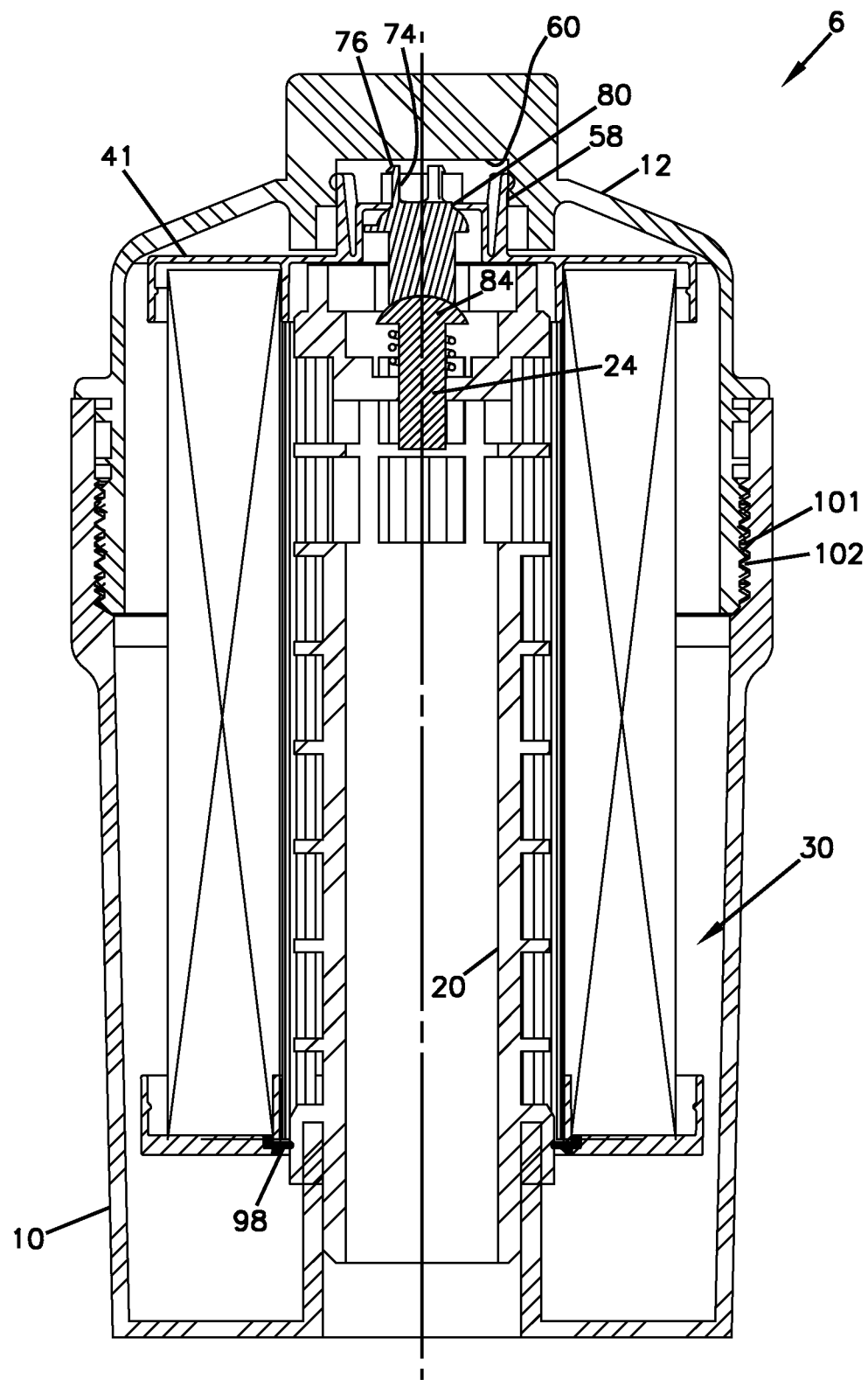
FIG. 3 is a cross-sectional view of the filter assembly of FIGS. 1 and 2, depicting the filter assembly operably assembled in an operable condition ready for filtering.

In FIGS. 1-3, a filter assembly 6, constructed according to principles of this disclosure is depicted. The assembly 6 includes a filter base 10 and a service cover 12 removably mounted on the filter base 10. Extending through the center of the filter base 10 is a porous center tube 20 and holding a spring member 22. The spring member 22 includes a spring plunger 24 with a spring force engaging upon it by a biasing member 26. The spring plunger 24 urges against a portion of a filter element when a filter element is properly and operably mounted for use in the filter base 10, and the service cover 12 is arranged.

In reference now to FIG. 1, an embodiment of a filter element mounted in the filter base 10 is illustrated generally at 30. In the embodiment shown, the element 30 includes a tubular extension of filter media 32 defining an open filter interior 34 (FIG. 2). The open filter interior 34 receives the center tube 20 therewithin. In the embodiment shown, the filter media 32 is pleated filter media 36.

The pleated media 36 defines first and second opposite ends 38, 39 (FIG. 4). In the embodiment shown, the filter element 30 further includes a first end cap 41 secured to the first end 38 of the pleated media 36. Attention is directed to FIG. 5, which illustrates a cross-sectional view of the embodiment of the filter element 30. In FIG. 5, the first end cap 41 defines an open aperture 43. While many embodiments are contemplated, in the particular embodiment shown, the first end cap 41 is defined by an outer peripheral wall 44 generally orthogonal to a planar region 46.

In the embodiment shown, the filter element 20 further includes a latch arrangement 50. In the embodiment shown, the latch arrangement 50 projects from the first end cap 41 and functions to releasably secure the filter element 30 to the service cover 12 (FIG. 3). In the embodiment shown, the latch arrangement 50 includes at least two latches, preferably four latches 52. Each of the latches 52 includes a deflectable latch finger 54 extending from the planar region 46 of the first end cap 41. In preferred embodiments, each latch finger 54 is molded from the same piece of material as the rest of the first end cap 41. Each of the latch fingers 54 includes a catch 56 at a free end of each latch finger 54.

As mentioned above, the latch arrangement 50 is usable to releasably secure the filter element 30 to the service cover 12. In FIGS. 2 and 3, it can be seen how the service cover 12 has a ring 58 projecting from an inside surface 60 of the service cover 12. Each of the fingers 54 deflects radially inwardly until each of the catches 56 snaps over the ring 58. This engagement removably attaches the filter element 30 to the service cover 12. In this manner, when the service cover 30 is removed from the base 10, the element 30 is removed with the service cover 12.

In reference again to FIG. 5, the filter element 30 further includes a tubular neck 62 extending from the first end cap 41 and circumscribing the first end cap aperture 43. As can be seen in FIG. 5, in the preferred embodiment shown, the tubular neck 62 is circumscribed by the latch arrangement 50. In the particular embodiment shown, the tubular neck 62 includes a cylindrical wall 64 and an axial end wall 66 forming a rim 68. The edge of the rim 68 defines the perimeter of the first end cap open aperture 43. In preferred arrangements, the tubular neck 62 is made from a same molded piece of material as the rest of the first end cap 41 and preferably including the latch arrangement 50.

In the particular embodiment shown, the tubular neck 62 is shorter than the latch arrangement 50. The neck 62 is provided to hold a valve head 70.

In reference to FIGS. 4 and 5, the valve head 70 is oriented within the first end cap open aperture 43. The valve head 70 is constructed and arranged to move between a position closing (preferably sealing) the first end cap aperture 43 and exposing the first end cap aperture 41. While a variety of embodiments are usable, in the particular embodiment illustrated in FIGS. 4 and 5, the valve head 70 includes an arm arrangement 72 slidably held within the tubular neck 62. The arm arrangement 72 engages against the rim 68 of the neck 62 and allows the valve head 70 to linearly or axially slide relative to the rest of the filter element 30 between the position closing the aperture 43 (FIG. 3) and exposing the aperture 43 (FIGS. 2 and 5).

Again, while a variety of implementations are possible, in the implementation illustrated in FIGS. 4 and 5, the arm arrangement 72 includes a plurality (illustrated as 3) of arms 74, each arm 74 having a hook 76. In the embodiment shown, the hook 76 is at a free end of each arm 74. The hooks 76 engage the rim 68 and prevent the valve head 70 from becoming dislodged within the interior of the filter element 30.

Still in reference to FIGS. 4 and 5, in the specific embodiment illustrated, the valve head 70 defines a sealing surface 78 sized to operably form a seal 80 (FIG. 3) with the first end cap aperture 43. In the illustrated embodiment, the valve head 70 also includes a plateau region 82 circumscribed by the sealing surface 78. The specific embodiment illustrated shows that the plurality of arms 74 extend from the plateau region 82 in an axial direction.

Again, in reference to FIG. 5, the valve head 70 further includes a seating surface 84 at an end opposite of the sealing surface 78 and plateau region 82. The seating surface 84 is sized to be seated and mounted on the spring member 22 (FIGS. 2 and 3) in the filter base 10, when the filter element 30 is operably mounted in the base 10. In the embodiment shown, the seating surface 84 has an inwardly curved profile that is shaped to receive and be mounted on the plunger 24 (FIGS. 2 and 3).

In reference again to FIGS. 4 and 5, the filter element 30 further includes a second end cap 88 secured to the second end 39. The second end cap 88 defines a second end cap aperture 90, which is in communication with the open filter interior 34. In the embodiment shown, the second end cap 88 includes an outer peripheral wall 92, generally orthogonal to a planar region 94. A seal member 96 is secured within the second end cap aperture 90 and is oriented to form a seal 98 (FIG. 3) with the filter base 10, specifically, a non-porous part of the center 20.

In preferred arrangements, the filter element 30 is primarily non-metallic, for example, at least 99 percent non-metallic.

In operation, the filter assembly 6 is used by directing liquid to be filtered into the filter assembly 6. The first end cap aperture 43 is blocked by using the spring member 22 in the filter base 10 to urge the valve head 70 against the rim 68 of the tubular neck 62. Liquid is then allowed to flow through the filter media 32 into the open filter interior 34. The filter media 32 helps to remove particulate material from the liquid. The filtered liquid is then directed out of the filter assembly 10.

In operation, if restriction across the filter media 32 becomes high from filter occlusion, or in the condition of a cold-start, the liquid to be filtered will exert a force on the valve head 70 through the aperture 43 which is greater than the force exerted by the spring member 22. This will cause the valve head 70, in particular the sealing surface 78, to move away from the rim 68 of the neck 62. A gap will open and allow liquid to flow through the first end cap open aperture 43, past the valve head 70, and into the open filter interior 34.

During normal operation, the sealing surface 84 of the valve head 70 will be in the condition shown in FIG. 3, pushed against the rim 68 and closing the aperture 43, which prevents liquid from bypassing the filter media 32. After a period of operation, it will be desirable to service the filter assembly 6 by replacing the filter element 30. A method of servicing the filter assembly 6 includes removing the service cover 12 and the used filter element 30 from the filter base 10. In the embodiment shown, the step of removing the service cover 12 also includes, simultaneously, removing the filter element 30 due to the engagement between the latch arrangement 50 and the ring 58 in the service cover 12. In the embodiment shown, this step will also include unmating the cover 12 and base 10 through the mating threads shown at 101, 102.

A new filter element 30 having a new valve head 70 is provided and is operably mounted in the filter base 10, including engaging the valve head 70 against the spring member 22 in the filter base 10. Specifically, in the embodiment shown, the seating surface 84 of the valve head 70 is oriented against the spring plunger 24. The service cover 12 is operably mounted over the new filter element 30 and the filter base 10. Thus, replacing the filter element 30 also replaces the valve head 70. This has advantages over arrangements that have the valve head in the other (non-replaceable) parts of the assembly. In such prior art arrangements, the valve piece is not replaced when the element is replaced, and that can lead to mechanical failure or other technical difficulties due to the valve piece wearing out.

The step of operably mounting the service cover 12 includes engaging the latch arrangement 50 extending from the first end cap 41 of the filter element 30 with an internal ring 58 in the service cover 12. The step of engaging the service cover with the filter element 30 can occur before positioning the filter element 30 in the base 10, or it can occur after positioning filter element 30 in the base 10. The service cover 12 and the base 10 are matably connected through the threads 101, 102.

I claim:

1. A filter element comprising:
    a tubular extension of pleated filter media having first and second opposite ends, the tubular extension of pleated filter media defining an open filter interior;
    a first end cap secured to the first end of the filter media, the first end cap having a first end cap aperture and a radially extending region extending from the first end cap aperture to an outer perimeter of the media;
    a second end cap secured to the second end of the filter media, the second end cap having a second end cap aperture in communication with the open filter interior;
    a latch arrangement extending beyond the radially extending region in an axial direction and away from the media,
    the filter element further including a tubular neck coaxial with the first end cap and the first end cap aperture, the tubular neck being circumscribed by the latch arrangement,
    a valve head oriented within the first end cap aperture and retained by the filter element, the filter element constructed to retain the valve head while the filter element is in an uninstalled state, the valve head being at least partially positioned within the open filter interior and constructed and arranged to move between a position preventing flow through the first end cap aperture and a position permitting flow through the first end cap aperture.

2. A filter element according to claim 1 wherein:
    (a) the tubular neck includes a cylindrical wall and an axial end wall forming a rim; the rim defining the first end cap aperture.

3. A filter element according to claim 1 wherein:
    (a) the latch arrangement includes at least two latches.

4. A filter element according to claim 3 wherein:
    (a) the tubular neck is shorter than the latch arrangement.

5. A filter element according to claim 1 wherein:
    (a) the filter element is at least 99% non-metallic.

6. A filter element according to claim 2 wherein:
    (a) the valve head includes a plurality of arms each having a hook to engage the rim of the neck, the filter element retaining the valve head while the filter element is in an uninstalled state by engagement between each of the hooks and the rim.

7. A filter element according to claim 1 wherein:
    (a) the latch arrangement is adjacent to the first end cap.

* * * * *